United States Patent

Zegers et al.

[15] 3,671,864

[45] June 20, 1972

[54] TRANSMISSION SYSTEM FOR MEASURING TIME OF TRANSMISSION

[72] Inventors: Leo Eduard Zegers; Wilfred Andre Maria Snijders, both of Emmasingel, Eindhoven, Netherlands

[73] Assignee: U.S. Philips Corporation, New York, N.Y.

[22] Filed: June 17, 1970

[21] Appl. No.: 47,001

[30] Foreign Application Priority Data

June 21, 1969 Netherlands..........................6909540

[52] U.S. Cl. ................................325/38 A, 325/41, 325/50, 325/67, 328/46, 328/51

[51] Int. Cl. ..........................................................H04b 1/00

[58] Field of Search..................340/146.1; 325/38, 38 A, 41, 325/45, 42, 48, 49, 50, 58, 141, 143, 145, 146, 153, 323, 324, 419–423, 67; 179/15 AE; 328/41, 43, 46, 50, 51

[56] References Cited

UNITED STATES PATENTS 3,562,710 2/1971 Halleck..............................340/146.1

*Primary Examiner*—Robert L. Richardson
*Assistant Examiner*—Albert J. Mayer
*Attorney*—Frank R. Trifari

[57] ABSTRACT

A transmission system wherein a periodic ternary pulse pattern is generated in the transmitter which pattern is transmitted after modulation on a carrier, for example, single sideband modulation, and which is correlated after demodulation with a periodic binary pulse pattern after reception in the receiver.

4 Claims, 5 Drawing Figures

INVENTORS
LEO E. ZEGERS
WILFRED A.M. SNIJDERS
BY
[signature]
AGENT

INVENTORS
LEO E. ZEGERS
WILFRED A.M. SNIJDERS
BY
Frank R. Trifari
AGENT

INVENTORS
LEO E. ZEGERS
WILFRED A.M. SNIJDERS
BY
Frank R. Trifari
AGENT

INVENTORS
LEO E. ZEGERS
WILFRED A.M. SNIJDERS
BY
[signature]
AGENT

INVENTORS
LEO E. ZEGERS
WILFRED A.M.SNIJDERS
BY
Frank R. Trifari
AGENT

TRANSMISSION SYSTEM FOR MEASURING TIME OF TRANSMISSION

The invention relates to a transmission system including a transmitter and a receiver for the transmission of signals in a prescribed frequency band the transmitter being provided with a pulse pattern generator controlled by a clock pulse oscillator to produce a periodic binary pulse pattern the pulses of which occur in an irregular succession and coincide with a series of equidistant clock pulse originating from the clock pulse oscillator. In the receiver the received pulses are applied to a modulation device to which also a locally obtained pulse pattern is applied originating from a local pulse pattern generator controlled by a local clock pulse oscillator and corresponding to the pulse pattern generator in the transmitter, the output of the modulation device being connected to a smoothing filter the output voltage of the smoothing filter being applied to a frequency-determining member of the local clock pulse oscillator so as to automatically correct its phase.

The pulse pattern generators in transmitter and receiver may be constituted, for example, by a shift register having a number of cascade-arranged shift register elements, a modulo-2-adder being incorporated between two elements and the outputs of the shift register being fed back to the shift register input and to the second input of the modulo-2-adder, while the contents of the shift register elements are shifted under the control of the clock pulse oscillator connected thereto.

Such transmission systems, which are based on the so-called correlation technique, have the considerable advantage that the transmitted pulse pattern at the receiver end can very clearly be distinguished from other signals, for example, constituted by noise signals which are located in the same frequency band, even when the level thereof is 25 to 30 dB higher than the level of the pulse pattern. The transmitted periodic pulse pattern may advantageously be utilized for synchronization purposes or for location with the aid of radar equipment.

An object of the present invention is to provide a novel conception of a transmission system of the type described in the preamble, wherein together with an extension of the possibilities of use a considerable improvement in the accuracy of the phase stabilization of the local pulse pattern generator is obtained while using a simple modulation device.

The transmission system according to the invention is characterized in that in the transmitter two uniform periodic binary pulse patterns are derived from the pulse pattern generator, which pulse patterns have a mutual time shift of two clock periods at the most, the transmitter furthermore being provided with a code converter incorporating a difference producer to the input terminals of which the two mutually time-shifted periodic binary pulse patterns are applied, a ternary pulse pattern to be transmitted being derived from the output terminals of said code converter, while in the receiver the received periodic ternary pulse pattern is applied to the modulation device to which also the periodic binary pulse pattern originating from the local pulse pattern generator is applied for generating a control voltage which automatic phase stabilization is applied through the smoothing filter to the frequency-determining member of the local clock pulse oscillator.

The present invention provides a novel theory in the field of correlation techniques, namely — in contradistinction to the known correlation principle according to which two mutually uniform pulse patterns are multiplied in the modulation device — two pulse patterns which are different both in their frequency spectrum and in shape are multiplied in the modulation device in the transmission system according to the present invention.

In order that the invention may be readily carried into effect, a few embodiments thereof will now be described in detail by way of example with reference to the accompanying diagrammatic drawings, in which:

FIG. 1 shows a transmission system according to the invention while FIG. 3 shows a further embodiment of a transmission system according to the invention, while

Figure 1:
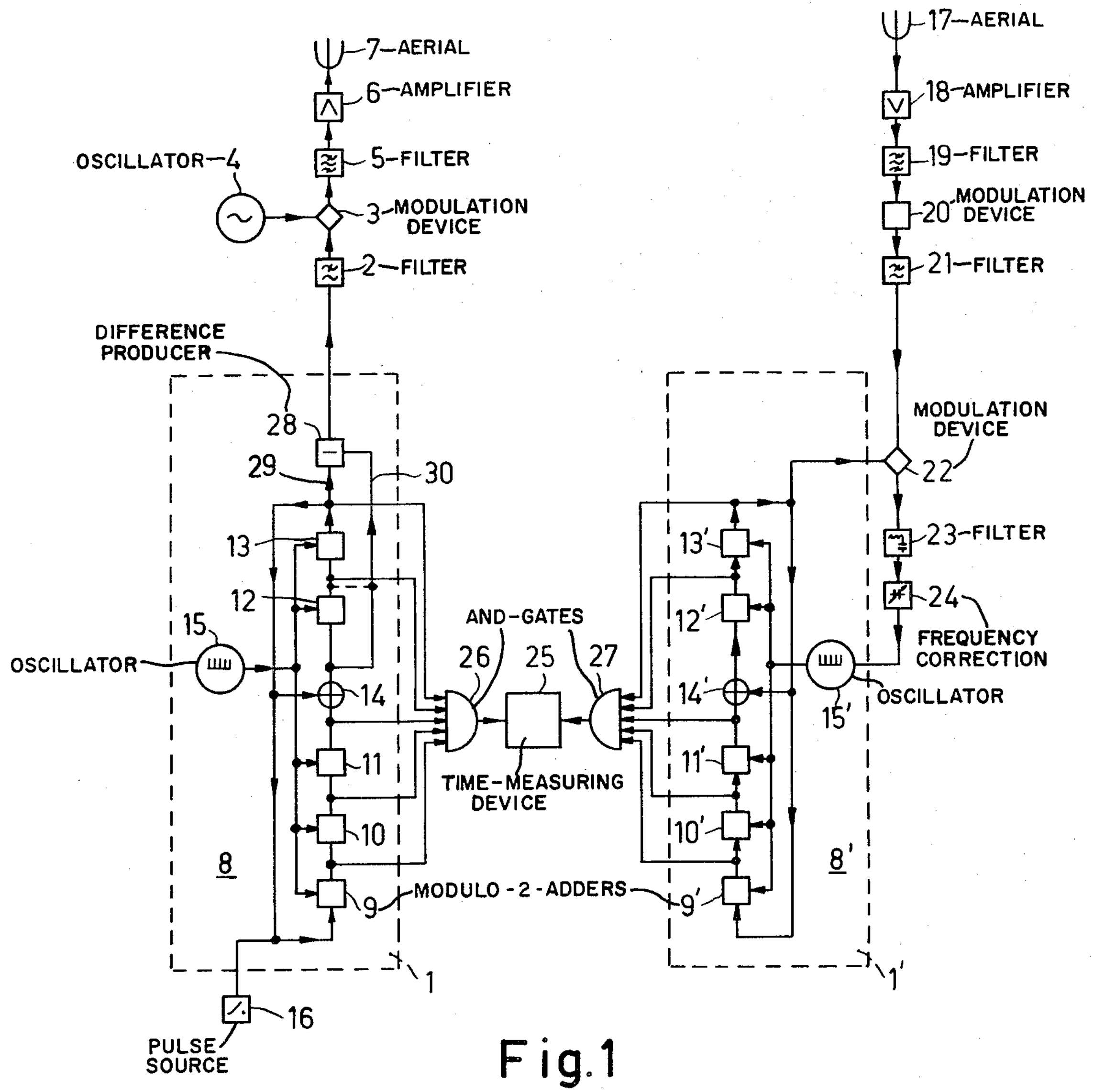

FIG. 1 shows a transmission system according to the invention in the form of a radar system having a transmitter and a receiver for the transmission of signals to which a frequency band of, for example, 1.5 MHz is allotted. In this radar system the pulse pattern originating from a pulse pattern generator 1 is applied through a lowpass filter 2 to a modulation device 3 to which also an oscillator 4 is connected. The modulation device 3 may be formed, for example, as a frequency modulator or as an amplitude modulator. The output signal from the modulation device 3 is applied through a band-pass filter 5 and a transmitter amplifier 6 to an aerial 7.

The pulse pattern generator 1 comprises a fed-back shift register 8 having a number of cascade-arranged shift register elements 9, 10, 11, 12, 13 and a modulo-2-adder 14 coupled between the third and fourth shift register elements 11 and 12. The output of the shift register 8 is fed back to the input of the shift register and to the second input of the modulo-2-adder 14. The contents of the shift register elements 9-13 are shifted at a constant shift period D by a clock pulse generator 15 which is connected to the shift register 8, while furthermore a starting pulse source 16 is connected to the input of the shift register 8. As is known, the modulo-2-adder 14 supplies an output pulse only if pulses of different values occur simultaneously at the two inputs, and it does not supply an output pulse of the two simultaneously occurring input pulses have the same value. If the pulse pattern generator 1 is actuated and a single starting pulse is supplied to the shift register 8 by the starting pulse source 16, said pulse will be shifted through the shift register 8 by the clock pulse generator 15 and be fed back through the feedback circuit, from the output to the modulo-2-adder 14 and to the input, so that as a result of the feedback the shift register 8 will start to generate a series of pulses which has a recurrent period. Particularly, it may be shown mathematically that when using $n$ shift register elements in cascade and when suitably choosing the location of the modulo-2-adder the occurring pulse pattern has a period of $T = (2^n - 1)D$, wherein $D$ is the length of the shift period. For example, in the pulse pattern generator 1 of FIG. 1, wherein $n = 5$, the period $T$ of the pulse pattern is $(2^5 - 1)D = 31D$. In the embodiment shown the pulse pattern occurring at the output of the pulse pattern generator 1 and having a period of $T = 31D$ has the shape shown in FIG. 2*a*.

In the receiver shown in FIG. 1, wherein the elements corresponding to those in the transmitter have the same reference numerals, but are provided with indices, the pulse pattern received by an aerial 17 is applied through a receiver amplifier 18 and a bandpass filter 19 to a demodulation device 20. The output signal from the demodulation device 20 is applied through a low-pass filter 21 to a modulation device 22 which is formed as a product modulator and to which also a local pulse pattern generator 1' corresponding to the pulse pattern generator 1 in the transmitter is connected, the output of the product modulator 22 being connected to a smoothing filter 23 in the form of an integrating network the output voltage of which controls a frequency corrector 24 formed, for example, as a variable reactance which corrector is connected to an oscillator 15' serving as a local clock pulse generator. For measuring the time shift between the pulse patterns which are generated at the transmitter end and at the receiver end the radar system is provided with a time-measuring device 25 to which two AND-gates 26 and 27 are connected whose inputs are connected to the outputs of the shift register elements 9 – 13 and 9' – 13' of transmitter and receiver, respectively. When a pulse simultaneously occurs at all outputs of the shift register elements 9 – 13 in the transmitter, which as is known occurs only once per period T of the generated pulse pattern, the AND-gate 26 will apply a pulse to the time-measuring device 25 to which also a pulse is applied by the AND-gate 27 when a pulse simultaneously occurs at all outputs of the shift register elements 9′ – 13′ in the receiver. The distance in time between the output pulses of the two AND-gates 26 and 27 is then exactly equal to the time shift to be determined between the pulse patterns generated at the transmitter and receiver ends which time shift is decisive for the distance between an object and the radar system.

An important property of the radar system described so far is its remarkable insensitivity to noise; particularly, the pulse patterns received after reflection against the object can clearly be distinguished from the noise received, even if the noise level is 25 to 30 dB above the level of the received pulse pattern. This property is of particular advantage especially in long-distance radar.

To extend the possibilities of use while maintaining a remarkable insensitivity to noise, according to the invention, two uniform periodic binary pulse patterns are derived from the pulse pattern generator 1 in the transmitter these pulse patterns having a mutual time shift of two clock periods at the most, the transmitter furthermore being provided with a code converter incorporating a difference producer 28 to the input terminals of which the two mutually time-shifted periodic pulse patterns are applied through lines 29, 30, from the output terminals of the difference producer 28, a periodic ternary pulse pattern is derived which is transmitted. In the embodiment shown the output of the shift register element 13 and the output of the modulo-2-adder 14 are to this end connected to the difference producer 28 so that the mutual time shift of the two pulse patterns is equal to twice the clock period D.

Figure 2:
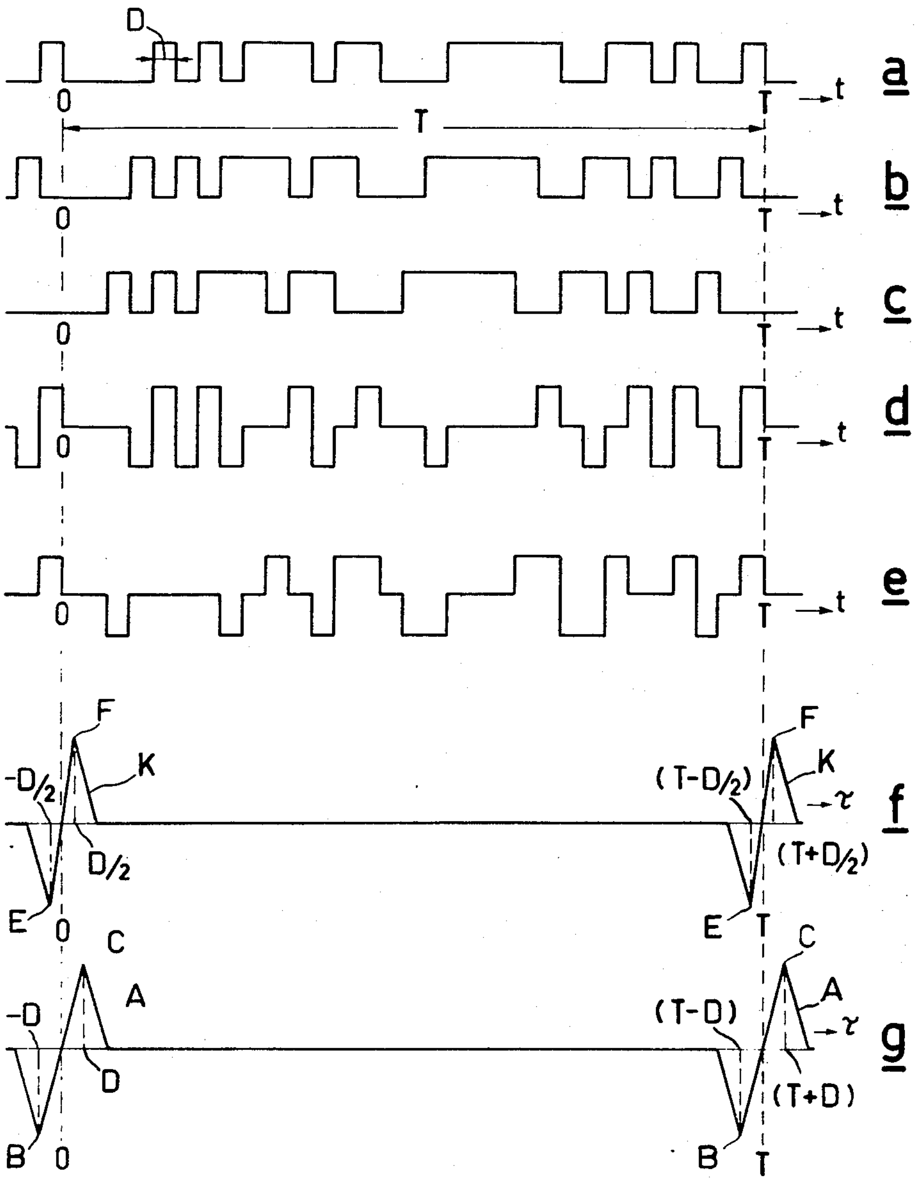
FIG. 2 shows a few time diagrams to explain the transmission system shown in FIG. 1.

The binary pulse pattern (0000101011101100011111001101001) illustrated in FIG. 2*a* occurs at a period T at the output of the shift register element 13, where a binary value 1 represents a positive voltage and a binary value 0 represents a zero voltage, while the binary pulse pattern (0010101110110001111100110100100) occurring at the output of the modulo-2-adder 14 is illustrated in FIG. 2*c*. By forming a difference signal of the two pulse patterns mutually shifted in time over two clock periods, the pulse pattern (00-10000-1010-1110-1-10011-1-11001-101) illustrated in FIG. 2*e* is obtained at the output of the difference producer 28 which pattern is transmitted by the aerial 7 after modulation in the modulation device 3. When the same signal voltage 1 or 0 occurs simultaneously at the two inputs of the difference producer 28 a voltage 0 occurs at the output thereof while in case of simultaneous occurrence of different signal voltages at the inputs of the difference producer 28 a voltage 1 or a voltage −1 is derived from the output thereof dependent on whether a voltage 1 or a voltage 0 or, conversely, a voltage 0 and a voltage 1, respectively, occur at the inputs of the difference producer 28. Thus, a periodic ternary pulse pattern occurs at the output of the difference producer 28 which pulse pattern is transmitted after modulation as a ternary pulse pattern by the transmitter aerial 7.

In the receiver the carrier-modulated pulse pattern reflected by the object is received with the aid of the aerial 17 and is applied after demodulation in the demodulation device 20 for recovering the transmitted ternary pulse pattern of the shape shown in FIG. 2*e* to the product modulator 22 to which also the binary pulse pattern of the shape shown in FIG. 2*a*and originating from the local pulse pattern generator 1′ is applied for generating the control voltage which for automatic phase stabilization is applied through the smoothing filter 23 to the frequency-determining member 24 of the local clock pulse generator 15.

Although the ternary pulse pattern according to FIG. 2*e* has both a different shape and a different frequency spectrum as compared with the binary pulse pattern according to FIG. 2*a*, it is found that by multiplying the two pulse patterns in the product modulator 22, a control characteristic is obtained which is particularly favorable for phase stabilization and whose shape is shown in FIG. 2*g* wherein $\tau$ represents the time delay of the local binary pulse pattern relative to the received ternary pulse pattern. As may be evident from this Figure a phase control occurs during two clock periods only in case of a phase relation of the two pulse patterns corresponding to the leading portion of curve A, whereas no phase control is obtained beyond this relation. In case of a mutual phase initial relation of the two pulse patterns corresponding to the leading portion of curve A, the occurring phase control of the clock pulse oscillator 15′ tends to shift the mutual phase relation of the two pulse patterns to the phase point determined by the point of intersection of the edge BC of the control characteristic A and the horizontal axis. In the device described an accurate phase stabilization is obtained by means of the particularly simple receiver due to the great slope of the edge BC of the control characteristic A which results in an accurate range measurement in the radar system according to the invention.

In addition to the ternary pulse pattern used in FIG. 1 and obtained by forming the difference signal of the two binary pulse patterns mutually shifted in time over two clock periods, in the device according to the invention, ternary pulse patterns may likewise be used derived from two binary pulse patterns having a smaller mutual time shift. As will be explained with reference to the time diagrams of FIG. 2*a*, FIG. 2*b*, FIG. 2*d* and FIG. 2*f*, the embodiment will now be described wherein the binary pulse patterns are derived from the outputs of the shift register elements 12 and 13 as is shown by a broken line in FIG. 1, so that the pulse patterns have a mutual time shift of one clock period.

As previously described, FIG. 2*a* illustrates the pulse pattern occurring at the output of the shift register element 13, while FIG. 2*b* illustrates the pulse pattern advanced by one clock period, and FIG. 2*d* illustrates the ternary pulse pattern obtained by difference production, which pattern after modulation in the modulation device 3 and after demodulation in the demodulation device 20 is applied to the product modulator 22 together with the binary pulse pattern of the local pulse pattern generator 1′. FIG. 2*f* shows the control characteristic K obtained which even results in a more accurate phase stabilization and hence in a more accurate range measurement than that for the previously described embodiment, because the slope of the edge EF of the control characteristic A has a steeper variation as will be directly evident from the control characteristic K in FIG. 2*f*. The question whether either this embodiment or the embodiment of FIG. 1 is used depends on the prevailing circumstances.

An extension of the mutual time shift of the two binary pulse patterns for generating the ternary pulse pattern to more than two clock periods is found to give rise to a control characteristic which is no longer useful for phase stabilization. Thus, only a limited number of ternary pulse patterns suitable for phase stabilization are useful.

Together with the accurate phase stabilization obtained with particular simplicity in construction in case of strong noise, which results in an accurate range measurement even in the case of signal-to-noise ratios of −25 or −30 dB, the transmission system according to the present invention likewise provides considerable transmission-technical advantages, particularly a maximum increase of the information contents within the available bandwidth, More in detail the output signal from the difference producer 28 is found to have a frequency spectrum due to difference production of the two mutually time-shifted pulse patterns, which frequency spectrum is particularly suitable for single sideband modulation, as will now be described with reference to the frequency observations below.

If it is assumed that a signal $Ae^{j\omega t}$ is applied through line 30 to the difference producer 28 in the embodiment of FIG. 1, the signal of line 29 delayed over two clock periods 2D may be represented by the formula $Ae^{j\omega(t-2D)}$ wherein A represents the amplitude and $\omega$ represents the angular frequency, the relation of which angular frequency $\omega$ with the frequency $f$ being given by the formula:

$$\omega = 2\pi f \quad (1)$$

Then an output signal of the shape:

$$Ae^{j\omega t}(e^{-2j\omega D}-1) \quad (2)$$

appears at the output of the difference producer 28 so that the transfer characteristic $\phi(\omega)$ of the difference producer 28 may be written as:

$$\phi(\omega) = e^{-2j\omega D} - 1 \quad (3)$$

or after some conversion:

$$\phi(\omega) = Ce^{-j\omega D} \sin\omega D \quad (4)$$

wherein C represents a constant. Thus a spectrum component of arbitrary angular frequency $\omega$ of the pulse signal applied to the difference producer 28 will have a constant time delay in accordance with the factor $e^{-j\omega D}$ which corresponds to a linear phase characteristic, as well as an amplitude variation which is proportional to the absolute value of $\sin \omega D = \sin 2\pi fD$ which function thus represents the frequency characteristic $\psi(f)$ of the difference producer 28.

Figure 3:
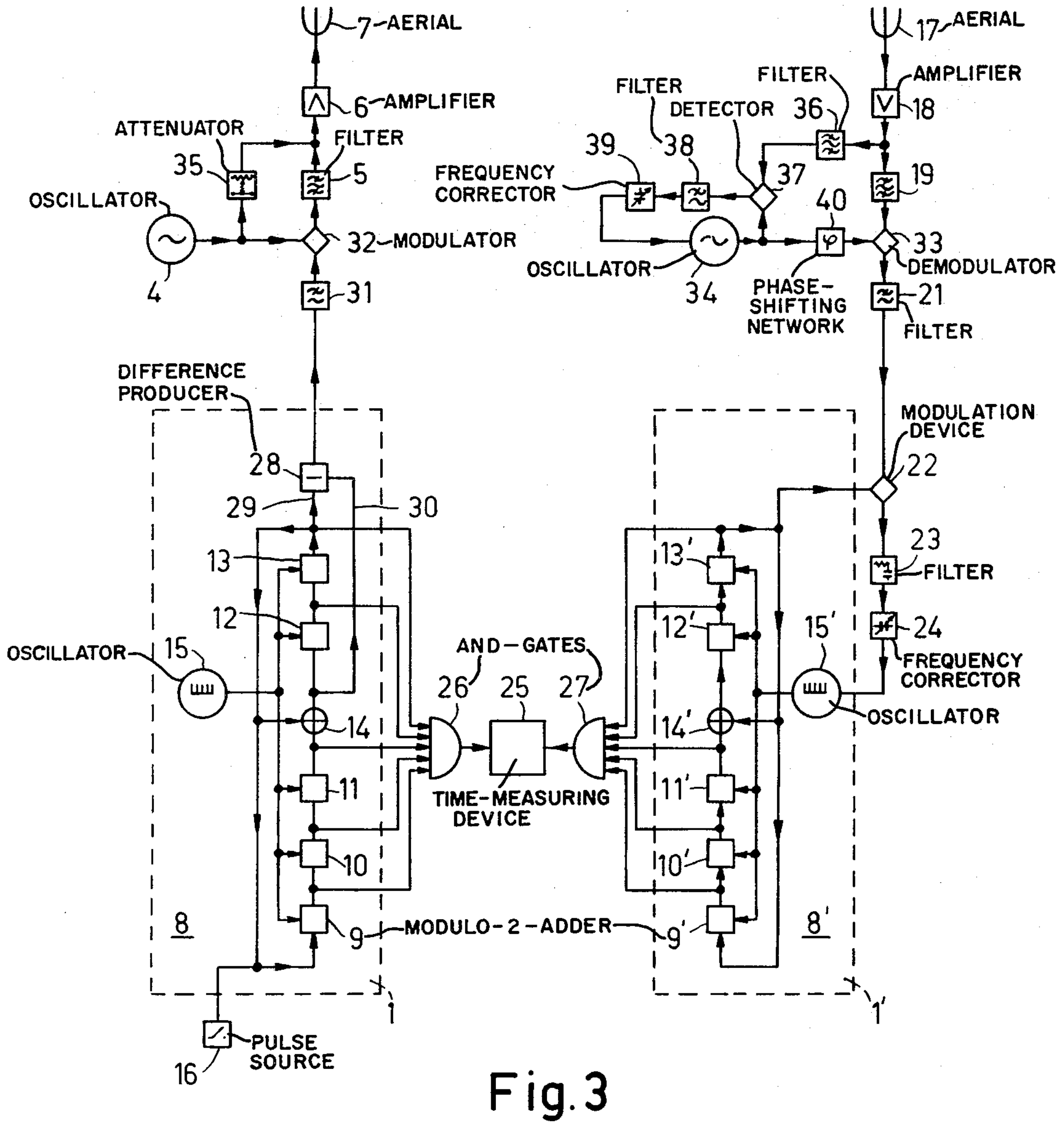
Figure 4:
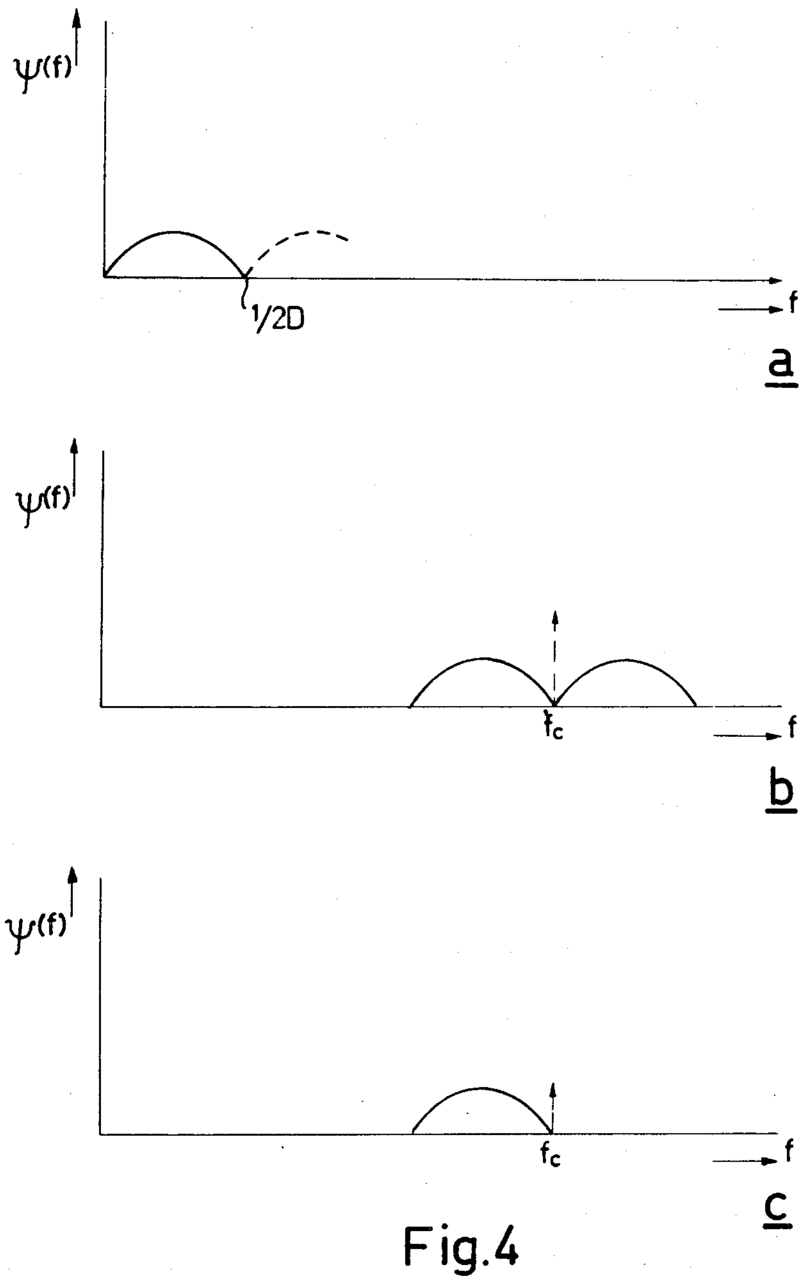
FIG. 4 shows a few frequency diagrams in explanation of the transmission system of FIG. 3.

For the purpose of illustration, FIG. 4a shows the frequency characteristic $\psi(f)$ which, as may be apparent, has spectral zero points in case of the direct-current term and in case of full multiples of the spectrum components ½ D. The pulse pattern shown is particularly advantageous for single sideband transmission as will be explained with reference to FIG. 3, for in that case it will suffice to suppress the spectrum components exceeding half the clock frequency ½ D by means of a simple low-pass filter 31 and subsequently to modulate the signal thus obtained on a carrier feeding a push-pull modulator 32, for example, of the ring modulator type.

At the output of the push-pull modulator 32 the two modulation sidebands with suppressed carrier frequency are derived. One of the modulation sidebands, for example, the lower sideband being transmitted through the output filter 5 by the transmitter aerial 7. FIG. 4b shows the output spectrum constituted by the two modulation sidebands, in which the dotted line arrow at the carrier frequency $f_o$ represents the carrier frequency suppressed in the push-pull modulator 32.

At the receiver end, the received single sideband signal is applied for demodulation to a single sideband demodulator 33 in the form of a synchronous demodulator, for example, a push-pull modulator to which is connected a local carrier oscillator 34 of the same frequency as the carrier frequency $f_c$ of the carrier oscillator 4 of the transmitter end, the output signal of the single-sideband demodulator 33 being applied to the product modulator 22 for phase stabilization of the local clock pulse oscillator 15'. In the manner as described with reference to FIG. 1, the distance between the radar system and the object is determined in the time-measuring device 25 from the time shift between the pulse patterns generated at the transmitter end and at the receiver end.

To obtain optimum conditions of reception it should be ensured that not only the frequency but also the phase of the local carrier oscillator 34 of the single sideband demodulator 33 is accurately equal to that of the carrier associated with the received single sideband signal, which in the embodiment shown is obtained by using an automatic phase stabilization control. More in detail, a pilot signal of carrier frequency $f_c$ is co-transmitted with the single sideband signal by connecting the carrier oscillator 4 through an attenuator 35 to the output of the filter 5, so that the spectrum shown in FIG. 4c is transmitted by the transmitter aerial 7. At the receiver end the pilot signal of carrier frequency $f_c$ is selected with the aid of a pilot filter 36 and after comparison with the local carrier oscillation in a phase detector 37 it is applied through a low-pass filter 38 to a frequency corrector 39 for automatic phase stabilization of the local carrier oscillator 34. Due to this automatic phase stabilization the local carrier oscillator 34 will accurately follow the carrier of the received single sideband signals in frequency and in phase, a remaining constant phase difference between the local carrier oscillator 34 and the carrier of the received single sideband signaled being compensated by incorporating a phase-shifting network 40 between the local carrier oscillator 34 and the synchronous demodulator 33.

Figure 5:
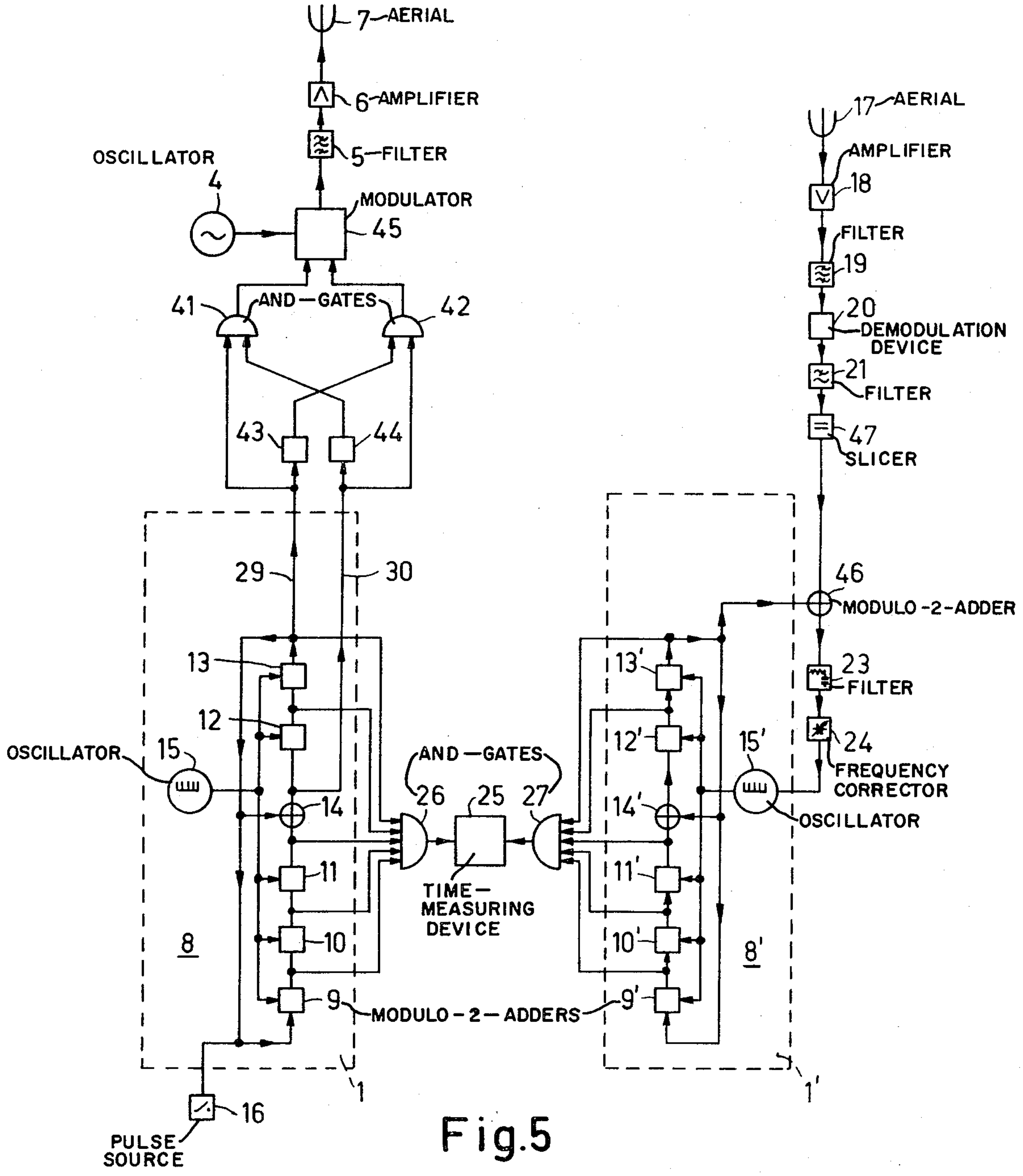
FIG. 5 shows a modification of the transmission system of FIG. 1.

When using the steps according to the invention it is achieve in this manner that, while maintaining optimum conditions of reception, the information contents are increased to a maximum within the available frequency band, In addition to the advantages already mentioned, namely the particular simplicity in construction of the receiver, the accurate phase stabilization obtained in case of strong noise and the maximum increase of the information contents within the available frequency band while maintaining optimum conditions of reception, the device according to the present invention has the additional advantage that is particularly suitable for construction in digital techniques which may render construction as an integrated semiconductor circuit possible, as will now be described in greater detail with reference to FIG. 5.

In the transmitter according to FIG. 5 a code converter including a digital difference producer comprising two selection gates 41, 42 in the form of AND-gates is used instead of a code converter including an analog difference producer such as, for example, a difference amplifier, the output lines 29, 30 connected to the pulse pattern generator 8 being directly connected to the AND-gates 41 and 42, respectively, while the output lines 29, 30 are likewise connected through the inverters 43 and 44 to the second inputs of the AND-gates 42 and 41, respectively. Exactly as in the embodiment of FIG. 1, the AND-gates will provide a voltage O when THE same signal voltage occurs simultaneously on the output lines 29, 30, while in case of simultaneous occurrence of different signal voltages on the output lines 29, 30 a voltage 1 is derived from the output of the AND-gate 41 or from the AND-gate 42 dependent on whether a voltage 1 and a voltage 0 occur at the output lines 29, 30 or, conversely, a voltage 0 and a voltage 1 occurs at the output lines 29, 30, respectively. If the output of the AND-gate 42 is inverted in an inverter and if this inverter output is combined with the output of the AND-gate 41 exactly the same output signal is obtained as that of the difference producer 28 of FIG. 1 and this output signal may be applied to a modulation input of the modulation device of FIG. 1. For example, in a frequency modulator the carrier frequency $f_c$ will be suppressed when a voltage 0 occurs and a frequency $f_1$ of $f_2$ will be transmitted when a voltage +1 or −1 occurs.

The embodiment described so far is particularly advantageous for use with a modulator 45 having two modulation inputs, the AND-gate 41 being connected to one modulation input and the AND-gate 42 being connected to the other modulation input. When using a frequency modulator, the same output frequencies are transmitted, for the carrier frequency $f_c$ is suppressed in case of a voltage 0 at both AND-gates 41, 42 and a frequency $f_1$ or $f_2$ is transmitted dependent on whether a voltage 1 occurs either at the output of the AND-gate 41 or at the output of the AND-gate 42.

In the receiver constructed in digital techniques a digital product modulator in the shape of a modulo-2-adder 46 is used instead of an analog product modulator in which case it is advantageous to have a slicer 47 precede the modulo-2-adder 46. It is found that the device described may be used with particular advantage in case of strong noise, while the local clock pulse oscillator 15' at the receiver end is accurately stabilized in phase by the received pulse pattern exactly in the same manner as described with reference to FIG. 1.

As described in the foregoing, both the transmitter and the receiver may be built up in a simple manner with the aid of digital techniques and they are particularly suitable for construction as integrated semiconductor circuits. For completeness' sake, it is to be noted that the embodiments in analog and digital techniques are mutually exchangeable, for example, the transmitter of FIG. 1 may be used in combination with the receiver of FIG. 5 and, conversely, the transmitter of FIG. 5 may be used in combination with the receiver of FIG. 1.

What is claimed is:

1. A transmission system comprising a transmitter and a receiver for the transmission of a modulated signal in a prescribed frequency band, said transmitter comprising a clock pulse generator having a given clock period, a first pulse pattern generator controlled by said clock pulse generator to produce a periodic binary pulse pattern having pulses which occur in an irregular succession and which coincide with a series of pulses from said clock pulse generator, means to produce two periodic binary pulse patterns from said first pulse pattern generator, said two periodic binary pulse patterns having a mutual time shift no greater than two of said clock periods, a code converter for producing a periodic ternary pulse pattern comprising a difference producer, and means to couple said two periodic binary pulse patterns to said code converter, and said receiver comprising means for coupling into a received signal comprising a carrier signal modulated by said periodic ternary pulse pattern generated by said transmitter, a demodulator connected to said coupling means for demodulating said received signal to obtain said periodic ternary pulse pattern, a local clock pulse generator comprising a frequency determining member, a second pulse pattern generator controlled by said local clock pulse generator for producing a pulse pattern produced by said first pulse pattern generator, a modulation device for generating a control voltage, means to couple said periodic ternary pulse pattern from said demodulator to said modulation device, means to couple said second pulse pattern generator to said modulation device, a smoothing filter coupled to said modulation device, and means to couple said smoothing filter to said frequency determining member.

2. A transmission system as claimed in claim 1, wherein the code converter comprises two selection gates and means to couple said periodic binary pulse patterns to the input means of said two selection gates.

3. A transmission system as claimed in claim 1, wherein said two periodic binary pulse patterns have a mutual time shift of equal to two of said clock pulse periods, said transmitter further comprising a low-pass filter coupled to said code converter for suppressing pulse frequency signal components above the clock frequency, a carrier oscillator, a single sideband modulator for generating said modulated signal coupled to said low pass filter and said carrier oscillator, and means to produce a pilot signal from said carrier oscillator.

4. A transmission system as claimed in claim 3, further comprising means to transmit said modulated signal and said pilot signal, said receiver further comprising a single sideband demodulator for recovering said pilot signal, a local carrier oscillator, and phase control loop means to phase stabilize said local carrier oscillator with said pilot signal.

* * * * *